United States Patent [19]

Paton et al.

[11] Patent Number: 4,716,273

[45] Date of Patent: Dec. 29, 1987

[54] ELECTRIC-ARC TRAINER FOR WELDERS

[75] Inventors: Boris E. Paton; Vsevolod V. Vasiliev; Valentin A. Bogdanovsky; Sergei N. Danilyak; Viktor M. Gavva; Jury P. Roiko; Valery A. Nushko, all of Kiev, U.S.S.R.

[73] Assignee: Institute Problem Modelirovania V Energetike Akademii Nauk Ukrainskoi SSR, Kiev, U.S.S.R.

[21] Appl. No.: 947,886

[22] Filed: Dec. 30, 1986

[30] Foreign Application Priority Data

Dec. 30, 1985 [SU] U.S.S.R. .............................. 400057[I]

[51] Int. Cl.[4] ................................................ B23K 9/10
[52] U.S. Cl. ................................ 219/130.01; 219/136; 434/234
[58] Field of Search ........................ 219/130.01, 136; 434/234

[56] References Cited

U.S. PATENT DOCUMENTS

| | | | |
|---|---|---|---|
| 3,867,769 | 2/1975 | Schow et al. | 434/234 |
| 4,103,141 | 7/1978 | Wristen | 219/130.01 |
| 4,375,026 | 2/1983 | Kearney | 219/130.01 |
| 4,452,589 | 6/1984 | Denison | 219/136 |
| 4,471,207 | 9/1984 | Hawkes | 219/130.01 |

FOREIGN PATENT DOCUMENTS 5569908 11/1977 U.S.S.R. .

OTHER PUBLICATIONS

"Trainer for Teaching Welders", by V. P. Lugin and V. A. Kuzmichev, Svarotchnoe Proizvodstvo, 1977, No. 9, pp. 50–51, (no translation).
"Trainer for Teaching Welders in Manual Argon-Arc Welding", by E. G. Uglov, and A. A. Gribov, Svarothchnoe Proizvodstvo, 1974, No. 7, p. 47, (no translation).

Primary Examiner—Clifford C. Shaw
Attorney, Agent, or Firm—Fleit, Jacobson, Cohn & Price

[57] ABSTRACT

An arc trainer for welders comprises a welding electrode simulator, a welding object simulating unit, a welding power source whose outputs are connected to the electrode simulator and to the welding object simulation unit, a unit controlling the quality of the simulated welding process and generation of feedback signals for the trainee, which is connected to the welding electrode simulator and to the welding power source, a unit monitoring variations of welding parameters, which is connected to the control unit and to the welding power source, and a helmet connected to the control unit.

10 Claims, 13 Drawing Figures

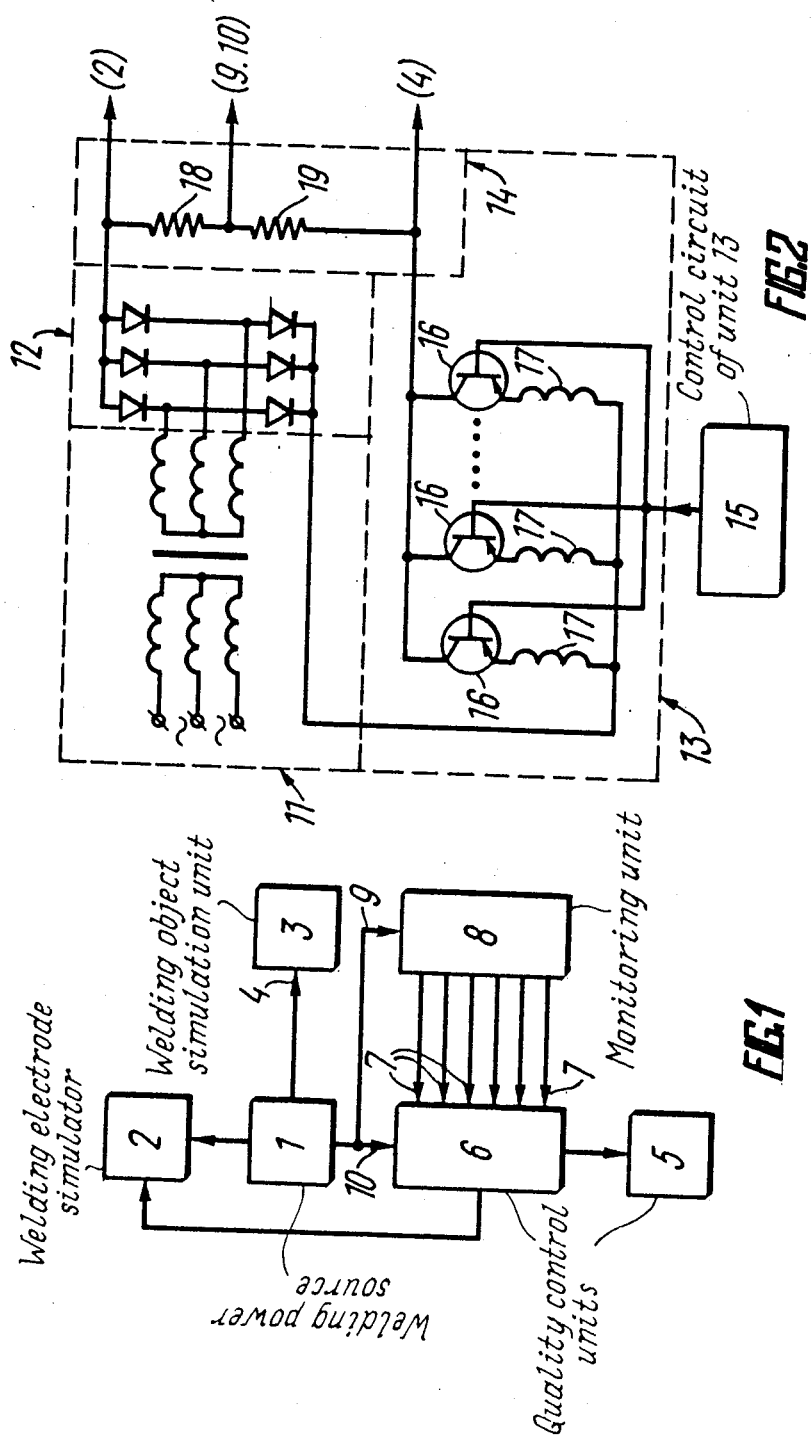

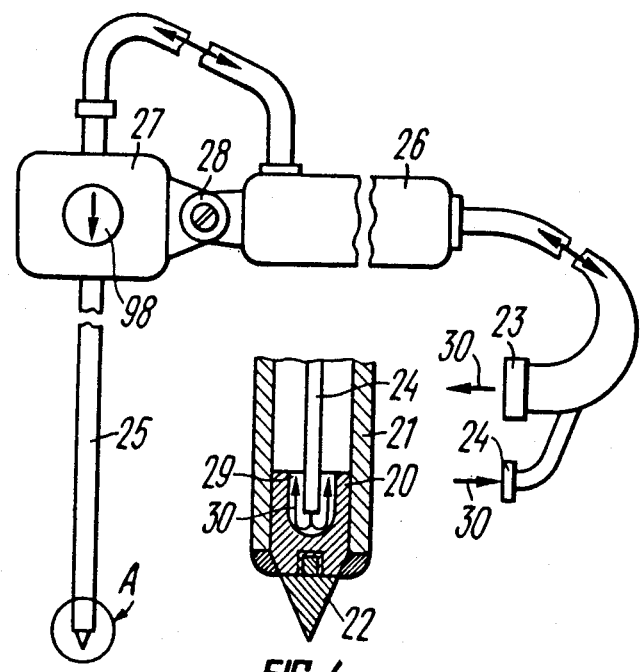
FIG. 3
FIG. 4
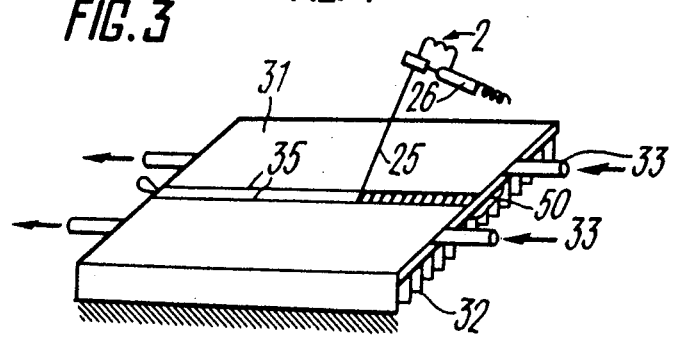
FIG. 5
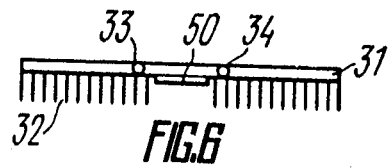
FIG. 6

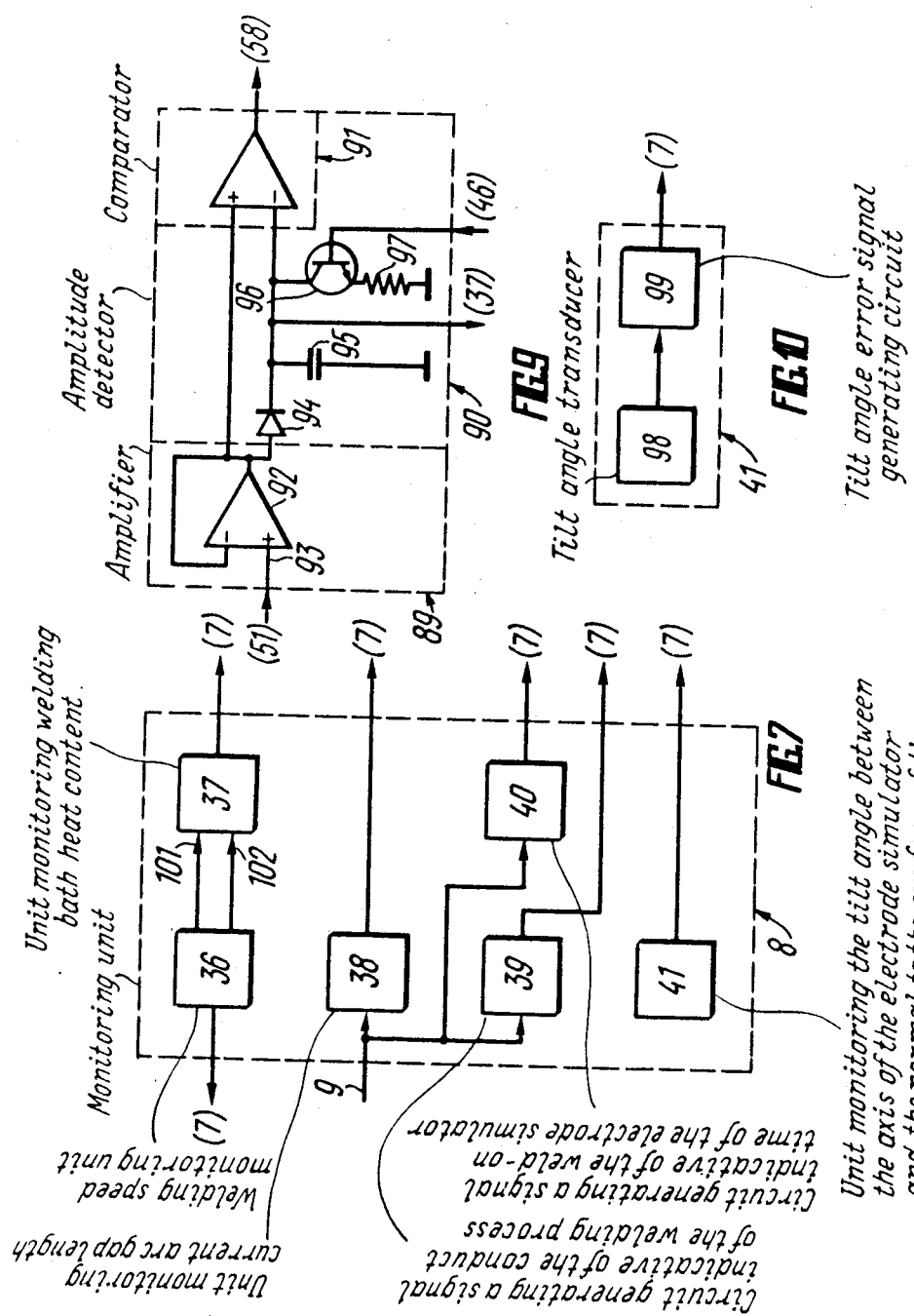

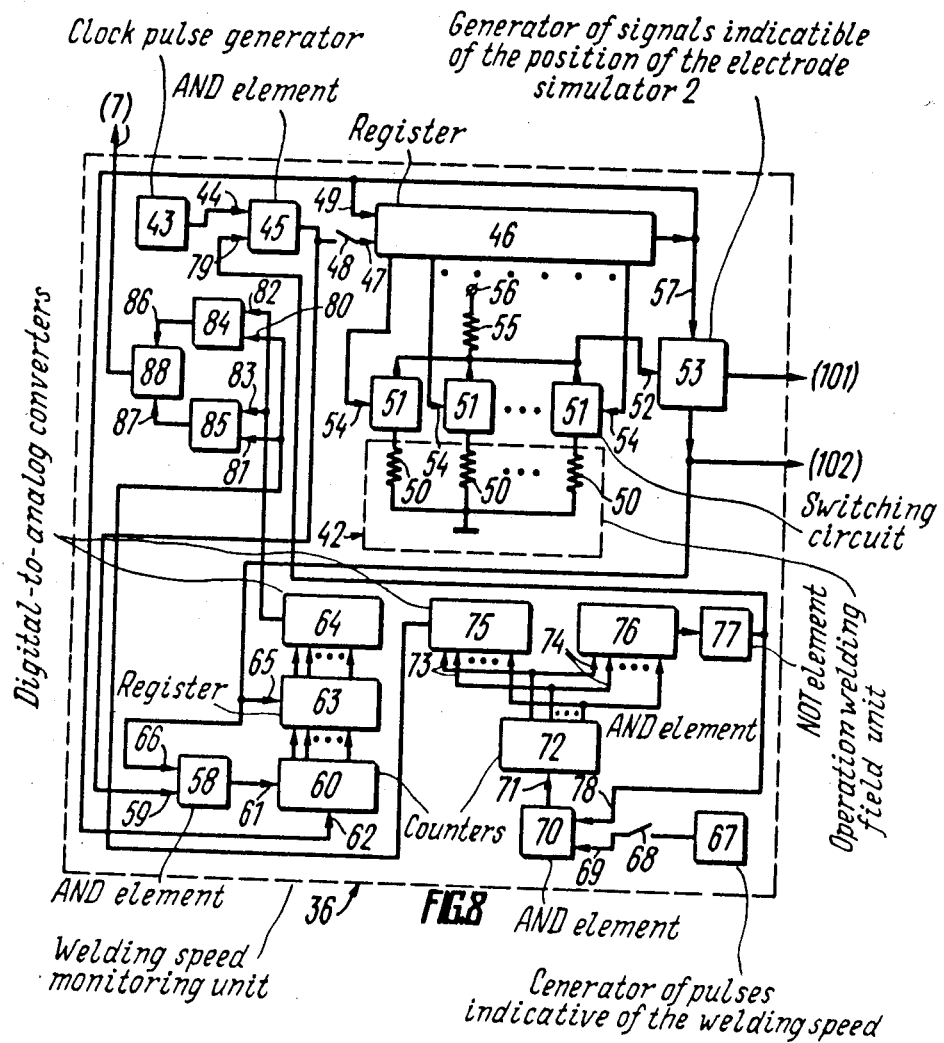

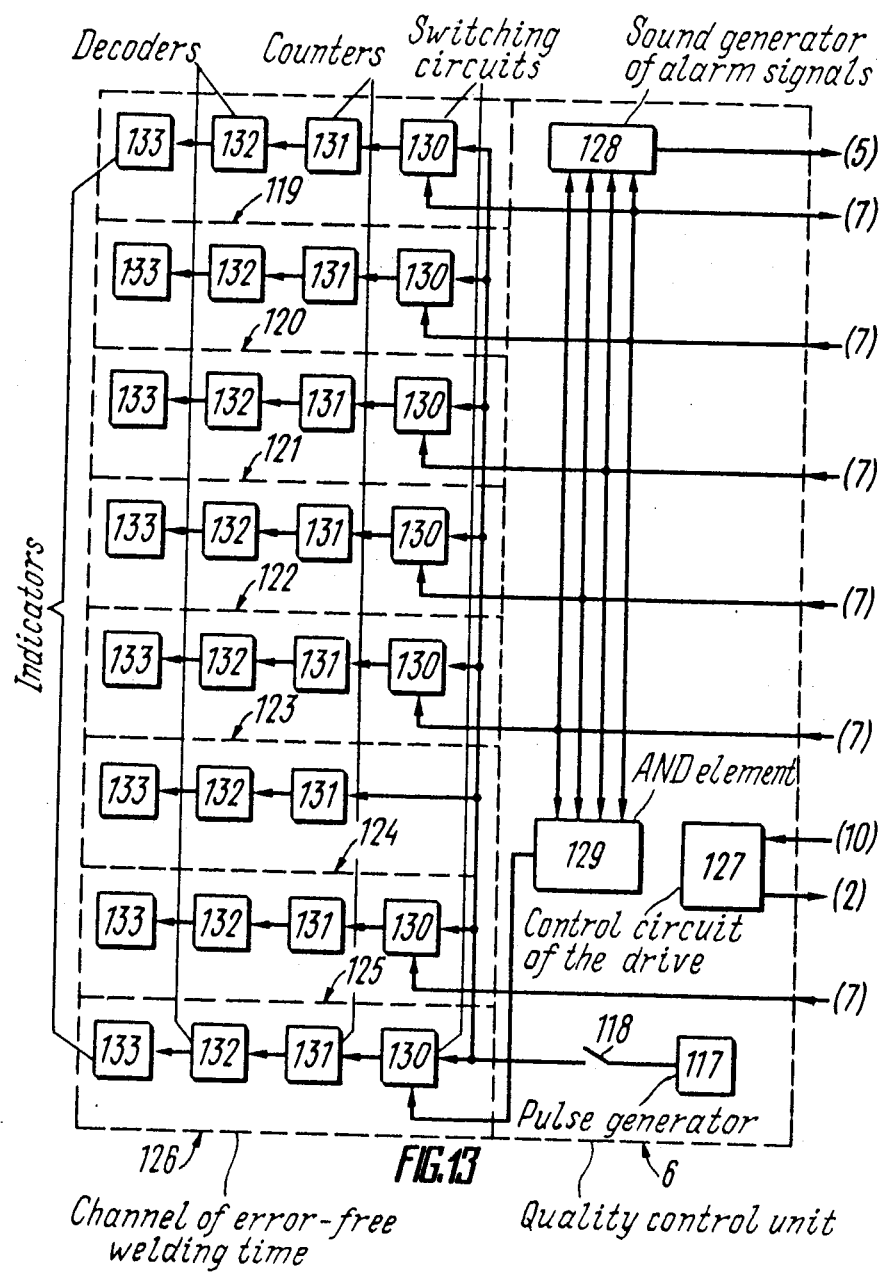

ELECTRIC-ARC TRAINER FOR WELDERS

FIELD OF THE INVENTION

This invention relates to training in tool handling and, particularly, to an arc trainer for welders.

The invention can be used as a training facility for teaching basic skills of manual electric-arc welding.

BACKGROUND OF THE INVENTION

Known in the art is a trainer for welders, which comprises an electric spark oscillator, a welding torch, and a model of a workpiece. This trainer can be used to teach the welder to strike an arc and maintain a specific arc gap, as well as to train in feeding the filling wire to the arc zone (cf., for example, E. G. Uglov, A. A. Gribov, Trainer for Teaching Welders in Manual Argon-Arc Welding, Svarotchnoe Proizvodstvo, 1974, No. 7, p. 47).

This trainer is deficient in that the welding situation is simulated poorly and inadequately. No real welding arc is provided, and the level of training of welders is comparatively low.

Also known in the art a trainer for welders, which comprises an electric spark generator and an electrode simulator equipped with a holder and a drive to simulate the electrode melting during welding. A thin sheet of conventional or electrographic paper is placed on the workpiece and the path of the electrode tip is traced thereon by the spark discharge. The trainer also comprises a pulse counter whose readings can be used to examine how many times the arc gap between the electrode and workpiece was interrupted or increased in excess of the specific length (cg., for exmaple, V. P. Lugin, V. A. Kuzmichev, Trainer for Teaching Welders, Svarochnoe Proizvodstvo, 1977, No. 9, pp. 50–51).

This trainer is deficient in that it can only be used to train welders in a limited assortment of welding processes. The training quality is low because no comprehensive monitoring is provided to control the manipulations of the welder trainee.

The closest prior art is a trainer for teaching welders basic skills of manual electric-arc welding, which comprises an electrode holder, a welding power source, an electric converter of the welding arc into sounds of different pitch, and a headset with earphones coupled to the welding circuit. In this trainer, welders are taught by means of a real electric-arc welding process where real electrodes and workpieces are used. But, any simulator of the welding electrode can be used instead of the electrode holder with the real electrode. Real workpieces can be replaced by a unit simulating the welding object, which can be made, for example, as a plate or a pipe, or some other similar object (c.f., for example, USSR Inventor's Certificate No. 5,569,908, published in "Otkrytiya, Izobreteniya, Promyshlennye Obraztsy, Tovarnye Znaki" No. 7, 1977, Inventors: A. A. Vasiliev, V. A. Kuznetsov, R. A. Smirnov).

This trainer makes use of a feedback audible signal which is produced by the converter for the trainee.

Disadvantages of this trainer consist in that high-quality and effective training of welders cannot be achieved because no objective criteria to assess the quality of the real arc process are available for the trainee.

Moreover, this trainer, as a teaching facility, is not functionally versatile. This makes the training process much longer and can even result in development of false perceptual motor skills in the process of training.

SUMMARY OF THE INVENTION

It is an object of this invention to provide an arc trainer for welders, which can eliminate subjective assessment of the quality of the training process.

Another object of this invention is to expand the volume of information available to the trainee.

One more object of the invention is to improve the quality of training of welders.

Yet another object of the invention is to broaden the functional capabilities of the arc trainer.

Still another object of the invention is to develop correct sensory-motor skills in the trainee.

A further object of the invention is to cut down the training period.

A still further object of the invention is to reduce the amount of materials expended for training, that is to reduce the amount of expended electrodes and materials used as workpieces.

This is achieved in that an arc trainer for welders, comprising a welding electrode simulator, a welding object simulation unit, a welding power source whose first output is connected to the welding electrode simulator and whose second output is connected to the welding object simulation unit, and a helmet with earphones, according to the invention, also comprises a unit for quality control of the simulated welding process and generating feedback signals for the trainee, which is connected to an input of the welding electrode simulator, to the helmet, and to the output of the welding power source, and a unit monitoring parameters of the welding process, which is connected to an input of the unit for quality control of the simulated welding process and to the outpout of the welding poewr source.

Advisably, the unit monitoring parameters of the welding process should comprise a welding speed monitoring unit, a welding bath heat content monitoring unit connected to the output of the welding speed monitoring unit, a unit monitoring the actual length of the arc gap, a unit monitoring the angle between the axis of the welding electrode simulator and the normal to the surface of the simulated welding object, a circuit generating a signal indicative of the welding process, a circuit generating a signal corresponding to the weld-on time of the welding electrode simulator to the welding object simulation unit, all outputs of all units and circuits being connected to the input of the unit for quality control of the simulated welding process and generating feedback signals for the trainee, while the output of the welding power source is connected to the input of the unit monitoring the actual length of the arc gap, to the input of the circuit generating a signal indicative of the welding process, and to the input of the circuit generating a signal corresponding to the weld-on time of the welding electrode simulator to the surface of the welding object simulator.

The unit for quality control of the simulated welding process should preferably comprise a pulse generator and, connected thereto via a switch, an arc gap length channel connected to the output of a unit for monitoring the actual length of the arc gap, a welding electrode simulator tilt angle channel connected to the tilt angle monitoring unit, a welding process thermal condition channel connected to an output of the unit for monitoring the heat content of the welding bath, a welding process speed channel connected to an output of the welding speed monitoring unit, an operating welding time channel connected to the circuit generating a signal corresponding to the welding process, a total welding time channel, a welding electrode simulator weld-on time channel connected to the circuit generating a signal corresponding to the weld-on time of the welding electrode simulator to the surface of the simulated welding object, an error-free welding time channel, a control circuit for the drive simulating the welding electrode burn-off, which is connected to the output of the welding power source and to the input of the welding electrode simulator, a generator of audible alarm signals and welding sound simulation, and an AND element, input of the generator of audible alarm signals and welding sound simulation and of the AND element being connected to the unit for monitoring the actual length of the arc gap, the tilt angle monitoring unit, the welding bath heat content monitoring unit, the welding speed monitoring unit, while the output of the sound generator is connected to the headset, and the output of the AND element is connected to the error-free welding time channel.

Advantageously, the welding speed monitoring unit should comprise a clock-pulse generator, a first AND element whose first input is connected to an output of the clock-pulse generator, a first register whose first input is connected via a switch to the output of the first AND element, a generator of signals corresponding to the location of the welding electrode simulator and heat content of the simulated welding process, whose first input is connected to the output of the first register, while the output thereof is connected to a second input of the first register, an operational welding field unit made up of a set of temperature-sensitive elements arranged parallel to the welding surface and rigidly secured in the welding zone along the welding direction, switching circuits, each such circuit having its control input connected to respective outputs of the first register and its output connected to respective temperature-sensitive elements of the operational welding field unit, while information inputs of each switching circuit are joined with the second input of the generator of signals corresponding to the location of the welding electrode simulator and the heat content of the simulated welding process and connected, via a resistance, to a supply line, a second AND element whose inputs are connected to the output of the first AND element and to the output of the generator of signals corresponding to the location of the welding electrode simulator, a first counter whose information input is connected to the output of the second AND element and whose reset input is connected to the output of the first register, a second register whose information inputs are connected to outputs of the first counter and whose control input is connected to the output of the generator of signals corresponding to the location of the welding electrode simulator, a first digital-to-analog converter whose inputs are connected to the outputs of the second register, a generator of pulses corresponding to the prescribed welding speed, and third AND element whose first input is connected, via a switch, to the output of the generator of pulses corresponding to the prescribed welding speed, a second counter whose input is connected to the output of the third AND element, another digital-to-analog converter whose inputs are connected to the outputs of the second counter, an AND element and a NOT element which are connected in series, inputs of the AND element being connected to the outputs of the second counter, while the output of the NOT element is connected to the second inputs of the first and third AND elements, two comparators, inputs of each comparator being connected to an output of the respective first and second digital-to-analog converters, and an OR element whose inputs are connected to outputs of both comparators, the output of the OR element and outputs of the generator of signals corresponding to the location of the welding electrode simulator and heat content of the simulated welding process are outputs of the welding speed monitoring unit, while the number of temperature sensitive elements is dictated by the size of welding surfaces and prescribed accuracy of monitoring the speed of the tip of the welding electrode simulator.

Profitably, the unit monitoring the actual length of the arc gaps should comprise a comparator of the lower limit of the permissible arc gap length, a comparator of the upper limit of the permissible arc gap length, whose inputs are the input of the unit for monitoring the actual length of the arc gap, a circuit prescribing the lower limit of the permissible arc gap length, a circuit prescribing the upper limit of the permissible arc gap length, whose outputs are connected to respective inputs of respective comparators of the lower and upper limits of the permissible arc gap length, and an OR element whose inputs are connected to outputs of the comparators of the lower and upper limits of the permissible arc gap length, while the output thereof is the output of the unit for monitoring the actual length of the arc gap.

Reasonably, the unit for monitoring the heat content of the welding bath should comprises a memory circuit whose inputs are inputs of the unit for monitoring the heat content of the welding bath, a comparator of the lower limit of the welding bath heat content and a comparator of the upper limit of the welding bath heat content, whose inputs are connected to the output of the memory circuit, a circuit prescribing the lower limit of the welding bath heat content and a circuit precribing the upper limit of the welding bath heat content, whose outputs are connected to respective inputs of respective comparators of the lower and upper limits of the welding bath heat content, and an OR element whose inputs are connected to outputs of the comparators of the lower and upper limits of the welding bath heat content, while the output thereof is the output of the unit for monitoring the heat content of the welding bath.

Also advisably, the unit for monitoring the angle between the ais of the welding electrode simulator and the normal to the surface of the simulated welding object should comprise a tilt angle transducer located on the welding electrode simulator, a circuit generating a tilt angle error signal, which is connected to the output of the tilt angle transducer and which is in fact a comparator whose output is the output of the tilt angle monitoring unit, so that the circuit generating a signal corresponding to the welding process is a comparator whose input is connected to the output of the welding power source and whose output is connected to the control unit, while the circuit generating a signal corresponding to the weld-on time of the welding electrode simulator to the surface of the simulated welding object is also a comparator whose input is connected to the output of the welding power source and whose output is connected to the control unit.

Advantageously, the generator of signals corresponding to the location of the welding electrode simulator and the heat content of the simulated welding process should comprse an amplifier whose input is connected to an amplitude detector and a comparator whose inputs are connected to outputs of the amplifier and the amplitude detector, the input of the amplifier and the input of the amplitude detector are inputs of the generator, while the outputs thereof are the output of the comparator and a second output of the amplitude detector.

The herein disclsoed trainer can make training of welders more efficient and improve the quality of training using the real arc welding process.

BRIEF DESCRIPTION OF THE ACCOMPANYING DRAWINGS

Other objects and advantages of the invention will become apparent from the following description, taken in conjunction with the accompanying drawings, wherein:

FIG. 1 shows a block diagram of an arc trainer for welders, according to the invention;

FIG. 2 shows a circuit diagram of a welding power source, according to the invention;

FIG. 3 shows a general view of a welding electrode simulator, according to the invention;

FIG. 4 shows an enlarged view along arrow A of FIG. 3;

FIG. 5 shows a schematic diagram of a welding objet simulation unit, according to the invention;

FIG. 6 shows a side view of FIG. 5.

FIG. 7 shows a block diagram of a unit monitoring parameters of the welding process;

FIG. 8 shows a block diagram of a welding speed monitoring unit;

FIG. 9 shows a schematic diagram of a signal generator, according to the invention;

FIG. 10 shows a block diagram of a tilt angle monitoring unit, according to the invention;

FIG. 13 shows a block diagram of a unit for quality control of the simulated welding process, according to the invention.

DETAILED DESCRIPTION OF THE INVENTION

Figure 11:
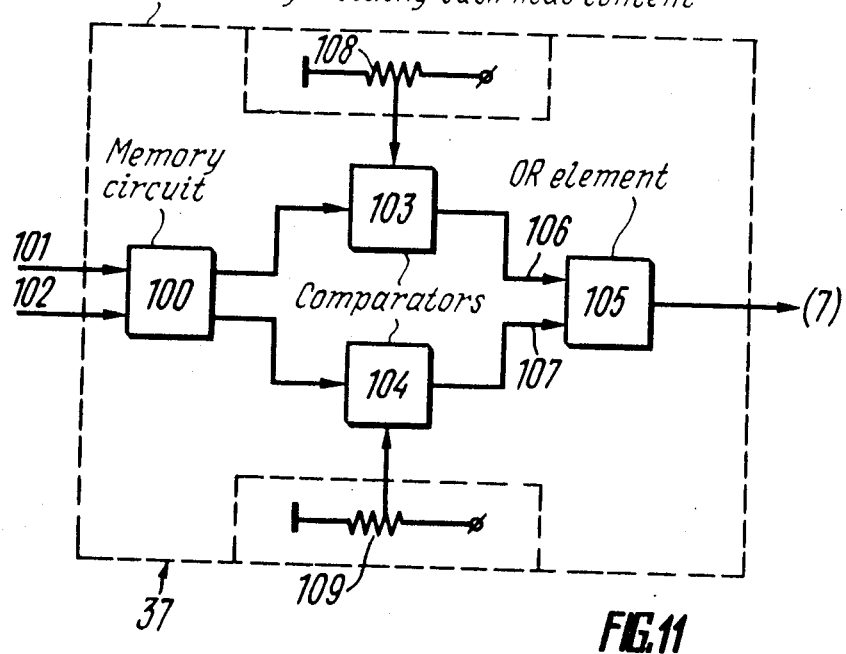
FIG. 11 shows a block diagram of a welding bath heat content monitoring unit, according to the invention.
Figure 12:
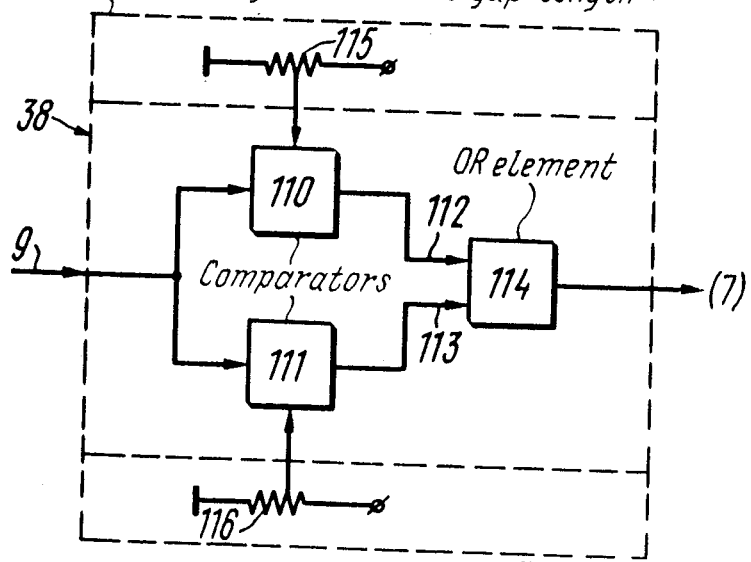
FIG. 12 shows a block diagram of a unit for monitoring the actual length of the arc gap, according to the invention.

An arc trainer for welders comprises a welding power source 1 (FIG. 1) whose output is connected to a welding electrode simulator 2, a welding object simulation unit 3 whose input 4 is connected to the output of the welding power source 1 and a headset 5 with earphones.

According to the invention, the trainer comprises a unit 6 for quality control of the simulated welding process and generation of feedback signals for the trainee. Inputs 7 of the unit 6 are connected to a unit 8 for monitoring parameters of the welding process. An input 9 of the unit 8 is connected to the welding power source 1. An input 10 of the quality control unit 6 is connected to the output of the welding power source 1, while the output of the unit 6 is connected to the welding electrode simulator 2.

The welding power source 1 may be a conventional power supply, one embodiment being shown in FIG. 2.

It comprises a power transformer 11, a rectifier 12, a welding current control unit 13, a voltage divider 14, and a circuit 15 to control the unit 13.

The transformer 11, the rectifier 12, the control unit 13, and the voltage divider 14 are connected in series. The welding current control unit 13 comprises parallel connected circuits made up of transistors 16 and inductors 17. Bases of all transistors 16 are connected to the output of the circuit 15. The voltage divider 14 is built around resistors 18 and 19.

The welding power source 1 produces a signal whose magnitude corresponds to the length of the arc gap, and external volt-current characteristic is drooping.

The trainer may be equipped with a welding electrode simulator 2 of conventional design, e.g. as the one shown in FIGS. 3 and 4.

A hollow metal cylinder 20 is rigidly secured at the end of a body 21 of the welding electrode simulator 2. A replaceable metal tip 22 is secured at the end of the hollow metal cylinder 20. A cooling liquid inlet pipe 24 is rigidly secured inside the body 21 of the welding electrode simulator 2 and in a cooling liquid outlet pipe 23.

The welding electrode simulator 2 also comprises an electrode 25, an electrode holder 26, and a drive 27 simulating electrode burn-off, which is connected by a hinge 28 to the electrode holder 26. The metal cylinder 20 is cooled by the liquid supplied to the inlet pipe 24 and flowing through ducts 29 inside this cylinder 20 in the direction indicated by arrows 30.

A welding object simulation unit 3 is used to simulate real welded joints and made as flat welded workpieces shown in FIGS. 5 and 6 as a plate 31 featuring cooling fins 32.

The cooling liquid flows through pipes 33 and 34. Lines 35 simulating the shape of workpiece edges are made on the surface of the plate 31.

In order to monitor basic parameters of the welding process and produce error signals when these parameters are not observed, the unit 8 (FIG. 7) comprises a welding speed monitoring unit 36 whose outputs are connected to a unit 37 for monitoring the heat content of the welding bath. Outputs of both units 36 and 37 are outputs of the unit 8. The input 9 of the unit 8 is connected to a unit 38 for monitoring the actual length of the arc gap, a circuit 39 producing a signal corresponding to the welding process, and a circuit 40 producing a signal corresponding to the weld-on time of the welding electrode simulator 2 (FIG. 1) to the welding object simulation unit 3. The unit 8 also comprises a unit 41 (FIG. 7) monitoring the angle between the axis of the welding electrode simulator 2 (FIG. 1) and the normal to the surface of the simulated welding object.

The welding speed monitoring unit 36 (FIG. 7) is intended to check if the trainee maintains a required welding speed and to produce welding speed error signals as shown in FIG. 8.

The welding speed monitoring unit 36 comprises an operational welding field unit 42, a clock pulse generator 43, an AND element 45 having its input 44 connected to the clock pulse generator 43, a register 46 having its input 47 connected, via a switch 48, to the output of the AND element 45.

The clock pulse generator 43 is to produce a continuous sequence of high frequency pulses and can employ a conventional square-pulse generator circuit.

The register 46 is an n-digit shift register whose output is connected to an input 49 thereof. This register 46 is peculiar in that a logical one state is available in only one digit, while all others are in the state of the logical zero.

The operational welding field unit 42 is intended to produce initial signals for the determination of the heat content of the welding bath and the speed of the welding process. This unit 42 is a set of temperature-sensitive elements 50, e.g. temperature-sensitive resistors or photodiodes or some other temperature-sensitive elements.

In this embodiment, temperature-sensitive resistors are arranged parallel to the surface of the plate 31 (FIG. 5) and rigidly secured near the zone of the simulated welding process, e.g. under the plate 31 along line 35 simulating the edges as shown in FIGS. 5 and 6.

The number of temperature-sensitive elements 50 is determined depending on the size of welded surfaces and the desired accuracy of controlling the motion of the tip of the electrode simulator 2.

Each temperature-sensitive element 50 (FIG. 8) is connected, via a respective switching circuit 51, to an input 52 of a generator 53 of signals corresponding to the location of the welding electrode simulator 2 (FIG. 1) and the heat content of the simulated welding process.

Second control inputs 54 (FIG. 8) of each circuit 51 are connected to a respective output of the register 46, while the outputs of the switching circuits 51 are connected, via a resistor 55, to a terminal 56 of the power source (not shown).

The output of the register 46 is connected to an input 57 of the generator 53 whose outputs are the outputs of the unit 36.

The welding speed monitoring unit 36 also comprises an AND element 58 whose input 59 is connected to the output of the AND element 45, a counter 60 whose input 61 is connected to the output of the AND element 58, while an input 62 thereof is connected to the output of the register 46, a register 63 and a digital-to-analog converter 64 which are connected in series. The counter 60, the register 63, and the digital-to-analog converter 64 are connected digit-by-digit. A control input 65 of the register 63 is jointed with an input 66 of the AND element 58 and connected to the output of the generator 53.

The welding speed monitoring unit 36 also comprises a generator 67 of pulses corresponding to the prescribed welding speed, whose output is connected, via a switch 68, to an input 69 of an AND element 70 whose output is connected to an input 71 of a counter 72. Outputs of the counter 72 are connected, respectively, to inputs 73 and 74 of a digital-to-analog converter 75 and an AND element 76 whose output is coupled with a NOT element 77. The output of the NOT element 77 is connected to an input 78 of the AND element 70 and to an input 79 of the AND element 45.

The output of the digital-to-analog converters 75 and 64 is connected to inputs 80 and 81, 82 and 83 of comparators 84 and 85 whose outputs are connected to inputs 86 and 87 of an OR element 88. The output of the OR element 88 is the output of the unit 36.

The register 46 is also intended for successive switching of switching circuits 51. A logical "one" is initially entered to the first digit of the register 46 which may employ any conventional shift register circuit.

Switching circuits 51 are intended for successive connection of temperature-sensitive elements 50 of the operational welding field unit 42 to the supply line via the resistance 55.

The first AND element 45, the second AND element 58, the third AND element 70, the fourth AND element 75, the NOT element 76, and switches 48 and 68 are intended for automatic control of the unit 36.

The purpose of the counter 60 is to produce a digital code defining the real location of the tip of the welding electrode simulator 2 (FIG. 5) on the surface of the plate 31. The counter 60 may employ a conventional circuit of a binary counter.

The purpose of the counter 72 (FIG. 8) is to produce a digital code defining the normal (standard) position of the tip of the welding electrode simulator 2 (FIG. 5) on the surface of the plate 31. The counter 72 may be similar to the counter 60.

The purpose of the register 63 (FIG. 8) is temporary storage of the digital code written in the counter 60.

The purpose of the digital-to-analog converters 64 and 75 is to convert digital codes entered to the register 63 and counter 64 into analog signals.

The pulse generator 67 is to produce a continuous sequence of pulses with a frequency of 0.1–10 Hz and is equipped with an infinitely variable frequency control. The frequency of the pulse generator 67 dictates the desired welding speed. The pulse generator 67 may employ a conventional circuit of a variable-frequency square-wave generator.

The purpose of the first comparator 84 is to produce an error signal indicative of the speed of the welding process, when the speed of the real welding process is below the nominal welding speed. The comparator 84 may employ a conventional circuit a comparator having a hysteresis characteristic.

The second comparator 85 is to produce a welding process speed error signal when the speed of the real welding process exceeds the nominal welding speed. It may be made similar to the comparator 84.

The AND element 88 is intended for selective transmission of welding speed error signals from the output of a comparator to the output of the unit 36.

The pulse generator 53 is to produce signals indicative of the position of the tip of the welding electrode simulator 2 (FIG. 5) on the surface of the plate 31 and of the heat content of the welding bath, as shown in FIG. 9.

The pulse generator 53 comprises an amplifier 89, an amplitude detector 90, and a comparator 91, all being connected in series. The amplifier 89 is made as an operational amplifier 92 whose input 93 is connected to outputs of the switching circuits 51 (FIG. (FIG. 8). The amplitude detector 90 comprises a diode 94, a capacitor 95, a switching element made up of a transistor 96 and a register 97.

The amplitude detector 90 is to produce a signal whose magnitude is indicative of the heat content of the welding bath and may employ a conventional circuit.

The comparator 91 is to produce a signal indicative of the position of the tip of the welding electrode simulator 2 (FIG. 5) on the surface of the plate 31 and may employ a conventional circuit.

The unit 41 monitoring the angle between the axis of the welding electrode simulator 2 and the normal to the surface of the simulated welding object is to produce an error signal indicative of the tilt angle of the welding electrode simulator 2, as shown in FIG. 10.

The unit 41 comprises a tilt angle transducer 98 and a circuit 99 generating a tilt angle error signal, which ae connected in series.

The tilt angle transducer 98 is to produce a signal whose magnitude is indicative of the angle between the axis of the welding electrode simulator 2 and the normal to the surface of the simulated welding object. It is a well known gravitationtype sensor which is disposed on the welding electrode simulator 2 (FIG. 3).

The circuit 99 generating a tilt angle error signal is to produce an error signal when the tilt angle of the welding electrode simulator deviates from the normal position. It is a comparator.

The unit 37 (FIG. 11) monitoring the heat content of the welding bath is to produce an error signal indicative of the thermal condition of the welding bath.

The welding bath heat content monitoring unit 37 comprises a memory circuit 100 whose inputs are inputs 101 and 102 of the unit 37 and whose outputs are connected to two comparators 103 and 104 of the upper and lower limits of the heat content of the welding bath, and an OR element 105. Inputs 106 and 107 of the OR element 105 are connected to outputs of the comparators 103 and 104. Other inputs of the comparator 103 and 104 are connected to circuits 108 and 109 prescribing the lower and upper limits, each circuit being made as a potentiometer.

The memory circuit 100 is intended for temporary storage of information indicative of the actual heat content of the welding bath.

The comparator 103 of the lower limit of the heat content of the welding bath is to produce an error signal indicative of the heat content of the welding bath when the actual heat content of the welding bath goes below its nominal value.

The comparator 104 of the upper limit of the heat content of the welding bath is to produce an error signal indicative of the heat content of the welding bath, when the actual heat content of the welding bath exceeds its nominal value.

The circuits 108 and 109 prescribing the lower and upper limits of the heat content of the welding bath are to assign or set the lower and upper boundaries of the nominal value of the welding bath heat content.

The OR element 105 is intended for selective transmission of output error signals indicative of the welding bath heat content to the output of the unit 37 monitoring the welding bath heat content.

The unit 38 monitoring the actual length of the arc gap is to produce an error signal indicative of the arc gap length. It comprises comparators 110 and 111 for, respectively, the lower and upper limits of the permissible arc gap length. Inputs of the comparators 110 and 111 are connected respectively, to inputs 112 and 113 of an OR element 114. Other inputs of the comparators 110 and 111 are connected, respectively, to circuits 115 and 116 prescribing the lower and upper limits of the permissible arc gap length. The circuits 115 and 116 are potentiometers.

The comparator 110 of the lower limit of the permissible arc gap length is to produce an error signal when the actual arc gap length is less than the nominal value.

The comparator 111 of the upper limit of the permissible arc gap length is to produce an error signal when the actual arc gap length exceeds its nominal value.

Circuits 115 adn 116 prescribing the lower and upper limits of the arc gap length are to set the lower and upper boundaries of the nominal arc gap length.

The OR element 114 is intended for selective transmission of output error signals indicative of the arc gap length to the output of the unit 37.

The circuit 39 (FIG. 7) generating a signal indicative of the welding process is to produce a signal when the welder strikes a welding arc. It may employ a conventional threshold element circuit.

The circuit 40 generating a signal indicative of the weld-on time of the welding electrode simulator to the surface of the simulated welding object is to produce an error signal when the tip of the welding electrode simulator is welded onto the surface of the simulated welding object. It may employ a conventional circuit of a threshold element.

The unit 6 (FIG. 13) for quality control of the simulated welding process comprises a pulse generator 117 and, coupled via a switch 118, the following channels: channel 119 of the arc gap length, channel 120 of the tilt angle of the welding electrode simulator, channel 121 of the welding thermal conditions, channel 122 of the welding process sped, channel 123 of the operational welding time, channel 124 of the total welding time, channel 125 of the weld-on time of the welding electrode simulator, channel 126 of the error-free welding time.

The simulated welding process qualtiy control unit 6 also comprises a control circuit 127 of the drive simulating the welding electrode burn-off, a sound generator 128 of alarm signals and welding sound simulation, and an AND element 129.

The pulse generator 117 is to produce timing pulses each second and may employ a conventional circuit of a pulse continuous-wave oscillator.

The switch 118 is intended to start the arc trainer for welders.

The channel 119 is intended for calculating and indicating the number of errors in maintaining a specific arc gap.

The channel 120 of the welding electrode simulator tilt angle is used to calculate and indicate the number of errors in maintaining the angle of the electrode simulator.

The channel 121 is intended to calculate and indicate the number of errors in maintaining the thermal conditions of the welding bath.

The channel 122 is intended to calculate and indicate the number of errors in maintaining the speed of the welding process.

The channel 123 is intended to calculate and indicate the operational welding time.

The channel 124 is intended to calculate and indicate the total welding time.

The channel 125 is intended to calculate and indicate the weld-on time of the welding electrode simulator.

The channel 126 is intended to calculate and indicate the error-free time of the welding process.

The circuit 127 controlling the drive simulating the welding electrode burn-off may be a conventional control circuit of a DC motor.

The sound generator 128 of alarm signals and welding noise simulation may employ a conventional circuit built around switching circuits and sound generators of sinusoidal signals, adjusted for different frequencies.

All channels are structurally indentical, each comprises a switching circuit 130, a counter 131, a decoder 132, and an indicator 133, except channel 124 which has no switching circuit.

Switching circuits 130 of the channels 119–122 are to transmit second pulses to inputs of respective counters 131 of errors in maintaining basic parameters of the welding process, such as the length of the arc gap, the angle of welding electrode simulator, thermal conditions of the welding bath, and the speed of the welding process.

Switching circuits 130 of the channels 123–126 are to pass second pulses to inputs of respective counters 131 of operational time, of the welding electrode simulator weld-on time, and error-free welding time, when such weld-on occurs or when the welding process is conducted without errors.

The counters 131 are to calculate the following: the number of errors in maintaining the length of the arc gap, the tilt angle of the welding electrode simulator, thermal conditions of the welding bath, the welding speed, as well as the time of error-free welding process, operational time of welding, total welding time, and the weld-on time of the welding electrode simulator.

The headset 5 is a standard arc-welding helmet equipped with earphones and a volume control (not shown).

Decoders 132 are intended to decode: the number of errors in maintaining the length of the arc gap, the tilt angle of the welding electrode simulator, thermal conditions of the welding bath, the speed of the welding process, and well as various time periods: operational welding time, total welding time, weld-on time of the electrode simulator, and error-free time of the welding process.

Indicators 133 are to display information contained in counters 131 and may employ, for example, gas-discharge or other indicators.

The arc trainer for welders operates as follows.

The trainee turns the device on, and using the circuits 108, 109, 115, and 116 sets the lower and upper limits of the permissible arc gap length and permissible heat content of the welding bath. The frequency of the pulse generator 67 is set in order to prescribe a standard welding speed. Operational levels of the circuit 99 generating a tilt angle error signal, comparators 85 and 84 of the welding speed monitoring unit 36, the circuit 39 generating a signal indicative of the welding process, the circuit 40 generating a signal indicative of the weld-on time of the welding electrode simulator 2 to the plate 31 are preset and require no adjustment prior to training.

Besides, the trainee has to connect the inlet pipe 24 and cooling liquid supply pipes 33 to a source, e.g. the water supply line, and the outlet pipe 23 and the cooling liquid discharge pipes 34 to a discharge outlet, e.g. sewage net.

The welding power source 1, the welding parameter monioring unit 8, and the control unit 6 are arranged in one casing which is placed conveniently. Flexible connection cables are used to hook up the operational welding field unit 42, the headset 5, and the welding electrode simulator 2.

The trainee takes the welding electrode simulator 2, puts on the helmet 5, and takes up the initial position near the welding object simulation unit 3 to start welding. Lines 35 simulating welding grooves are made on the surface of the simulated workpiece in advance.

The trainee is to move the top of the welding electrode simulator 2 along the simulated welding grooves and trace the path of the simulator tip as a burned-out trail on the plate 31. In this case, low current is used for training, when the maximum current of the welding power source is confined to a range of 10–15 A. Metal is not melted but only heated. Simultaneously, burn-off of the electrode is simulated. The trainee has to maintain within certain limits basic welding parameters: the length of the arc gap, the tilt angle between the axis of the welding electrode simulator and the normal to the surface of the simulated welding object, welding speed, and thermal conditions of the welding bath.

The trainee brings the tip of the welding electrode simulator 2 to the place where welding is to begin and presses the button activating the switches 48, 68, and 118, touches the surface of the plate 31 by the tip of the welding electrode simulator 2, stirkes an electric arc, and begins the welding process trying to keep all above welding parameters within the prescribed limits.

At this stage, output second pulses in the control unit 6 are supplied from the generator 117 to the total welding time channel 124 where the total welding time is counted to be digitally displayed. When the electric arc is initiated, the circuit 39 produces a signal indicative of the welding being in progress, which, in turn, permits second pulses to be fed from the generator 117 to the operational welding time channel 123 where the operational welding time is counted to be displayed.

Since the characteristic of the welding power source 1 is drooping, any change in the arc gap length results in changes in the output voltage of the welding power source 1. This principle is used to measure the arc gap length. The analog voltage taken from the output 11 of the welding power source 1 is supplied to the input 9 of the unit 38 monitoring the current arc gap length, where this analog voltage is compared with the lower and upper limits of the permissible arc gap length. In case the actual arc gap length exceeds the limits of the nominal arc gap length, either the comparator 110 of the lower limit or the comparator 111 of the upper limit operates. This lets second pulses to pass from the output of the generator 117 to the arc gap length channel 119 where the number of errors in the length of the arc gap is counted to be displayed.

The arc gap length analog signal is also supplied from the output of the welding power source 1 to the input of the circuit 40 generating a signal indicative of the weld-on time of the welding electrode simulator 2 to the plate 31. When the welder touches the plate 31 by the tip of the welding electrode simulator 2, the circuit 40 operates and produces a signal indicative of the weld-on time of the welding electrode simulator 2 to the plate 31, which, in turn, permits the passage of second pulses from the generator 117 of the control unit 65 to the welding electrode simulator weld-on time channel 125 where this weld-on time is counted to be displayed.

When the welder makes a mistake in keeping the nominal angle of the welding electrode simulator 2, the circuit 99 operates and produces a tilt angle error signal in the unit 41 monitoring the angle between the axis of the welding electrode simulator and the normal to the surface of the simulated welding object. This permits transmission of second pulses from the generator 117 of the control unit 6 to the tilt angle channel 120 where errors in maintaining the angle of the welding electrode simulator 2 are counted to be displayed.

The device also monitors such welding parameters as the welding speed and heat content of the welding bath.

Initially, in the welding speed monitoring unit 36 shown in FIG. 8, output signals of the pulse generator 67 are supplied via the AND element 70 to the input of the counter 72 where a number is stored, which unambiguously defines the nominal (correct) position of the tip of the welding electrode simulator 2 on the surface of the plate 31 along the simulated welding groove. The digital code stored in the counter 72 is converted in the digital-to-analog converter 75 is into an analog signal which is delivered to the inputs 80 and 81 of the comparators 84 and 85. In the course of training, the counter 72 is filled at a constant rate dictated by the nominal welding speed, which results in gradual change of the amplitude of the analog voltage at the output of the digital-to-analog converter 75 at a constant rate. Each digital code stored in the counter 72 unambiguously corresponds to a position of the tip of the welding electrode simulator 2 on the surface of the plate 31, while the word length in the counter 72 unambiguously defines the accuracy of monitoring the welding speed: the longer the word, the higher the accuracy.

Simultaneously, output signals of the clock pulse generator 43 whose generation frequency should be sufficiently high and constant are supplied via and AND element 45 to the input 47 of the register 46 which uses switching circuits 51 to successively connect the temperature-sensitive elements 50 of the operational welding field unit 42 to the input 52 of the generator 53.

If temperature-sensitive resistors having a positive temperature coefficient of resistance are used as the temperature-sensitive element 50, their resistance grows with temperature and, since these temperature-sensitive elements 50 are secured on the reverse side of the plate 31 along the simulated welding groove and the surface of the plate 31 is heated during welding, the temperature-sensitive elements 50 are also heated. The maximum temperature is achieved in the electric arc zone. It can be assumed that during welding the temperature-sensitive elements 50 are not heated uniformly, their temperature and resistance varies depending on the location of the electric arc on the surface of the plate 31. This principle is used to monitor the welding speed and heat content of the welding bath. Forced water cooling is employed to avoid overheating the welding object simulation unit 3 and to improve the accuracy of the welding speed monitoring unit 36 and the welding bath heat content monitoring unit 37.

During welding, as the temperature-sensitive elements 50 are successively connected to the input 52 of the generator 53 by means of the register 46, the analog voltage applied to the input 52 varies and depends on the temperature of the element 50 which is at this instant connected to the input 52 of the signal generator 53. The higher the temperature of the temperature-sensitive element 50, the less the voltage applied to the input 52.

The signal generator 53 operates as follows.

Let us assume that welding is in progress in the central part of the simulated welding object and the temperature of the temperature-sensitive elements 50 located in the central part is higher than of those elements 50 which are located in the beginning and end of the simulated welding object. This means that, when the temperature-sensitive elements 50 located in the portion of the workpiece from the beginning of the simulated welding groove to the welding spot are connected to the input 52 of the generator 53, the voltage applied to this input 52 grows, because the temperature of successively connecte elements 50 also grows as they become closer to the welding spot. The voltage across the capacitor 95 of the amplitude detector 90 repeats the voltage applied to the input 52 of the generator 53. When a temperature-sensitive element 50 located further on after the welding spot is connected to the input 52, the voltage starts decreasing, which renders the diode 94 of the amplitude detector 90 nonconductive and makes the comparator 91 operate. The capacitor 95 stores the voltage of the temperature-sensitive element 50 in the welding zone, which is the analog signal of the actual heat content of the welding bath, to be supplied from the output of the generator 53 to the input 101 of the unit 37 monitoring the heat content of the welding bath.

When the comparator 91 operates, the output signal of the generator 63 inhibits transmission of signals from the clock pulse generator 43 via the AND elements 45 and 58 to the input 61 of the counter 60. In this manner, the counter 60 stores a digital code defining the current position of the tip of the welding electrode simulator 2 on the surface of the plate 31. The output signal of the generator 51 also enters the digital information of the counter 60 to the register 63. The digital-to-analog converter 64 converts this digital information into an analog signal which is applied to the inputs 82 and 83 of the comparators 84 and 85.

If the trainee welder keeps the nominal welding speed, the digital codes stored in the counters 60 and 72 coincide throughout the welding process. Input signals of the comparators 84 and 85 also coincide and they remain inoperative and produce no error signals indicative of the welding speed. In case the digital codes do not coincide, when the welding speed deviates from its nominal value, one of the comparators 84 and 85 operates, depending on whether the welding speed is faster or slower than the nominal value, and produces an error signal. This signal permits transmission of second pulses from the generator 117 of the control unit 6 to the welding speed channel 122 where the number of errors in welding speed is counted and displayed.

After the last temperature-sensitive element 50 is connected to the input 52 of the generator 53, the register 46 produces a signal which resets the counter 60, discharges the capacitor 95 to the ground by means of the transistor 96 of the amplitude detector 90, and enters a logical "one" to the first digit of the register 46. Further on, the process of defining the digital code of the current position of the tip of the welding electrode simulator 2 on the surface of the plate 31 is repeated as described above, and so is the process of producing the analog signal indicative of the heat content of the welding bath.

When all digits of the counter 72 are filled and logical "one" is available at all outputs thereof, the AND element 76 operates and its output signal prevents, via the NOT element 77, signals from being applied to the inputs of the register 46 and counters 60 and 72, which means that the welding process is over and the welder has reached the end of the simulated welding groove on the simulated welding object.

The unit 37 monitoring the heat content of the welding bath operates as follows.

The analog signal indicative of the current heat content of the welding bath is supplied to the input 101 of the unit 37 monitoring the welding bath heat content from the generator 53 of the welding speed monitoring unit 36. This signal is stored in the memory circuit 100 at the moment, when a control signal is applied to the input 102 of the unit 37, which is simultaneously the control input of the memory circuit 100, from the output of the generator 53 of the welding speed monitoring unit 36. The analog signal indicative of the current heat content of the welding bath is supplied to inputs of the comparators 103 and 104 of the lower and upper limits of the welding bath heat content, which produce respective error signals if the heat content of the welding bath deviates from its nominal value. The welding bath heat content error signal is supplied from the output of the unit 37 monitoring the heat content of the welding bath to the input 7 of the control unit 6, where it permits transmission of second pulses from the output of the generator 117 to the channel 117 of the thermal conditions of the welding process, where the number of errors in maintaining the thermal conditions of the welding bath is counted and displayed.

If the welder maintains an error-free welding process, that is makes no mistakes in welding parameters being monitored, the AND element 129 operates and produces a control signal which permits transmission of second pulses from the output of the generator 117 of the control unit 6 to the error-free welding time channel 126 where the time of error-free welding is counted to be displayed.

During welding, an analog signal indicative of the current length of the arc gap is supplied from the output of the welding power source 1 to the input 10 of the control unit 6. This signal is delivered to the input of the circuit 127 which controls the drive simulating burn-off of the welding electrode as a function of the arc gap length. The longer the arc gap, the less the simulatd burn-off speed of the welding electrode. When the arc is disrupted or when the welding electrode simulator 2 welds on to the surface of the plate 31, simulation of the electrode burn-off is discontinued.

If the welder makes no mistakes in keeping the basic welding parameters within prescribed limits, a noise signal simulating normal welding process is supplied to the earphones of the helmet 5 from the output of the sound generator 128 of alarm signals and accompaniment signals. When some welding parameters deviates from normal, the sound generator 128 produces, apart from the welding noise signal, a whole set of tone signals of different pitch, which are alarm signals related to the basic welding parameters also fed to the earphones of the helmet 5. These signals are sound signals of inertialess feedback for the welder to known how these welding parameters are observed.

Moving the tip of the welding electrode simulator 2 over the surface of the welding object simulation unit 3, the welder traces the path of the tip of the welding electrode simulator 2 on the surface of the plate 31 along the simulated welding groove by the electric arc discharge. The trail left by the tip of the simulator 2 can be used to assess the actions of the trainee in the process of welding, since it is a documentary evidence of this welding process. The trail marks can be removed by sand paper for another training period.

All indicators 133 display the number of mistakes made. If the duration of the mistake is less than a second, it is disregarded and not recorded by error counter 131. If a mistake in maintaining a welding parameter is much longer, the counter 13 receives pulses each second and records how long a welding parameter was in error. The readings of the indicators 133 and the recorded path of the tip of the welding electrode simulator 2 are sued to assess the quality of welding. when the trainee has acquired some sensory-motor skills in performing welding in initially set conditions, tolerances of basic welding parameters may be made more narrow and the training process can be reperated in more complicated welding conditions.

The herein disclosed trainer can be used to develop correct snesory-motor skills by maintaining standard welding parameters: the length of the arc gap, the tilt angle of the welding electrode simulator, the welding speed, and the heat content of the welding bath, while operating a real welding arc.

This trainer can make the training process more efficient and widen the field of application of training facilities by using a real welding process. The training period can be made shorter and the quality of training can be improved as contrasted to other known type of trainers.

What is claimed is:

1. An electric-arc trainer for welders, said electric-arc trainer comprising:
    a welding electrode simulator having a first input to which a supply voltage is applied, and a second input to which a signal is applied to control a simulated electrode-melting rate depending on a running length of an arc gap;
    a welding power source having a first output connected to said first input of said simulator for applying the supply voltage to said simulator, a second output for ensuring together with said first output that welding current is running, and a third output at which a signal is produced to indicate the current arc gap length;
    a welding object simulation unit having an input connected to said second output of said welding power source;
    said welding electrode simulator interacting with said welding object simulation unit to produce a welding arc;
    a control unit having a first input, a second input, a first output, and a second output;
    said control unit producing sound signals received by the trainee to indicate if the simulated welding process is being run normally and counting the factors selected from a group including the number of errors made by the trainee, the operating time of the simulated welding process, the total time of the simulated welding process, the time of the simulated welding process without errors, and the weld-on time of the welding electrode simulator, and indicating at least one of said factors;
    said first input of said control unit being connected to said third output of said welding power source;
    said first output of said control unit being connected to said second input of said welding electrode simulator, and at which the signal is formed to control the simulated electrode-melting rate, depending on the running length of the arc gap;
    a unit monitoring parameters of the welding process, having an input to which the signal of the current arc gap length is applied, said input being connected to said third output of said welding power source and an output connected to said second input of said control input, at which output the signals are formed to correspond to the values of respective parameters of the simulated welding process;
    a helmet connected to said second output of said control unit at which signals are formed to provide feedback sound signals to inform the trainee if the welding process is correct.

2. An arc trainer for welders as claimed in claim 1, in which said unit monitoring welding process parameters comprises:
    a welding speed monitoring unit having an input and an output connected to said first input of said control unit;
    a unit monitoring the heat content of the welding bath, having an input connected to said output of said welding speed monitoring unit and an output connected to said first input of said control unit;

a unit monitoring the current arc gap length, having an input connected to said output of said welding power source and an output connected to said first input of said control unit;

a unit monitoring the tilt angle between the axis of said welding electrode simulator and the normal to the surface of said simualted welding object, having an input and an output connected to said first input of said control unit;

a circuit generating a signal indicating that welding is being performed, having an input connected to said output of said welding power source and an output connected to said first input of said control unit;

a circuit generating a signal indicative of the time said welding electrode simulator is welded on to said welding object simulation unit, having an input connected to said output of said welding power source and an output connected to said first input of said control unit.

3. An arc trainer for welders as claimed in claim 2, in which said unit controlling the quality of the simulated welding process comprises:

a pulse generator having an output;

a switch having an input connected to said output of said pulse generator and an output;

an arc gap length channel having an input connected to said output of said switch and to said output of said unit monitoring the arc gap length;

a circuit of the tilt angle of said welding electrode simulator, having an input connected to said output of said tilt angle monitoring unit;

a circuit of thermal conditions of the welding process, having an input connected to said output of said unit monitoring the heat content of the welding bath;

a welding speed channel having an input connected to said output of said welding speed monitoring unit;

a circuit of operational welding time, having an input connected to said output of said circuit generating a signal indicating welding is being performed;

a circuit of total welding time, having an input;

a circuit of weld-on time of the welding electrode simulator, having an input connected to said output of said circuit generating a signal indicative of the weld-on time of said welding electrode simulator;

a circuit of error-free welding time, having an input;

a control circuit of a drive simulating welding electrode burning off, having an input connected to said third output of said welding power source and an output connected to said second input of said welding electrode simulator;

a sound generator of alarm signals and sound accompaniment, having an input connected to said output of said unit monitoring the current length of the arc gap, to said output of said tilt angle monitoring unit, to said output of said unit monitoring the welding bath heat content, and to said output of said welding speed monitoring unit; said sound generator having an output connected to said helmet;

a first AND element having a first input connected to said output of said arc gap length monitoring unit, a second input connected to said output of said tilt angle monitoring unit, a third input connected to said output of said welding bath heat content monitoring unit, and a fourth input connected to said output of said welding speed monitoring unit; said first AND element having an output connected to said input of said error-free welding time channel.

4. An arc trainer for welders as claimed in claim 3, in which said unit monitoring the heat content of the welding bath comprises:

a memory circuit having inputs which are the inputs of said unit monitoring the heat content of the welding bath, a first output, and a second output;

a comparator of the lower limit of the welding bath heat content, having a first input connected to said first output of said memory circuit, a second input, and an output;

a comparator of the upper limit of the welding bath heat content, having a first input connected to said second output of said memory circuit, a second input, and an output;

a circuit setting the lower limit of the welding bath heat content, having an output connected to said second input of said lower limit comparator;

a circuit setting the upper limit of the welding bath heat content, having an output connected to said second input of said upper limit comparator;

a third OR element having a first input connected to said output of said comparator of the lower limit of the welding bath heat content, a second input connected to said output of said comparator of the upper limit of the welding bath heat content, and an output which is the output of said unit monitoring the welding bath heat content.

5. An arc trainer for welders as claimed in claim 3, in which said unit monitoring the angle between the axis of said welding electrode simulator and the normal to the surface of the simulated welding object, comprises:

a tilt angle transducer disposed on said welding electrode simulator and having an output;

a circuit generating a tilt angle error signal, electrically connected to said output of said tilt angle transducer and made as a comparator have an output which is the output of said tilt angle monitoring unit.

6. An arc trainer for welders as claimed in claim 3, in which said circuit generating a signal indicating welding is being performed, is a comparator having an input connected to said output of said welding power source and an output connected to said control unit.

7. An arc trainer for welders as claimed in claim 3, in which said circuit generating a signal indicative of the weld-on time of said welding electrode simulator to the surface of the simulated welding object, is a comparator having an input connected to said output of said welding power source, and an output connected to said control unit.

8. An arc trainer for welders as claimed in claim 3, in which said generator of signals indicative of the position of said welding electrode simulator comprises:

an amplifiers having inputs which are inputs of said generator of signals indicative of the position of the welding electrode simulator, and an output;

an amplitude detector having an input which is the input of said generator of signals indicative of the position of the welding electrode simulator and which is connected to said output of said amplifier, and an output;

a comparator having a first input connected to said output of said amplifier, a second input connected to said output of said amplitude detector, and an output which is the output of the generator of signals indicative of the position of the welding electrode simulator.

9. An arc trainer for welders as claimed in claim 2, in which said welding speed monitoring unit comprises:
a clock pulse generator having an output;
a second AND element having a first input connected to said output of said clock pulse generator, a second input, and an output;
a second switch having an input connected to said output of said second AND element, and an output;
a first register having a first input connected to said output of said switch, a second input, and a plurality of outputs;
a generator of signals indicative of the position of said welding electrode simulator and heat content of the simulated welding process; said signal generator having a first input connected to said one output of said first register, a second input, and an output connected to said second input of said first register, which is the output of said welding speed monitoring unit;
a plurality of temperature-sensitive elements, each said temperature-sensitive element disposed parallel to the welding surface and rigidly secured in the welding zone along the direction of welding; said plurality forming an operational welding field unit;
switching circuits whose number corresponds to the number of said temperature-sensitive elements; each said switching circuit having a control input connected to a respective output from said plurality of outputs of said first register, an information input to which supply voltage is applied and which is joined with said second input of said generator of signals indicative of the position of the welding electrode simulator;
a third AND element having a first input connected to said output of said second AND element, a second input connected to said output of said generator of signals indicative of the position of said welding electrode simulator, and an output;
a first counter having an information input connected to said output of said third AND element, a reset input connected to said output of said first register, and outputs;
a second register having information inputs connected to said outputs of said first counter, a control input connected to said output of said generator of signals indicative of the position of said welding electrode simulator, and an output;
a first digital-to-analog converter having inputs connected to said outputs of said second register, and an output;
a generator of pulses indicative of the prescribed welding speed, having an output;
a third switch having an input connected to said output of said generator of pulses indicative of the prescribed welding speed, and an output;
a fourth AND element having a first input connected to said output of said third switch, a second input, and an output;
a second counter having an input connected to said output of said fourth AND element, and outputs;
a second digital-to-analog converter having inputs connected to said outputs of said second counter, and an output;
a fifth AND element having inputs connected to said outputs of said second counter, and an output;
a NOT element having an input connected to said output of said fifth AND element, and an output connected to said second input of said second AND element and to said second input of said fourth AND element;
a first comparator having an input connected to said output of said first digital-to-analog converter, and an output;
a second comparator having an input connected to said output of said second digital-to-analog converter, and an output;
a first OR element having a first input connected to said output of said first comparator, a second input connected to said output of said second comparator, and an output which is the output of said welding speed monitoring unit.

10. An arc trainer for welders as claimed in claim 2, in which said arc gap length monitoring unit comprises:
a comparator of the lower limit of the permissible arc gap length, having an input and an output;
a comparator of the upper limit of the permissible arc gap length, having an input and an output;
a circuit setting the lower limit of the permissible arc gap length, having an output connected to said input of said comparator of the lower limit;
a circuit setting the upper limit of the permissible arc gap length, having an output connected to said input of said comparator of the upper limit;
a second OR element having a first input connected to said output of said lower limit comparator, a second input connected to said output of said upper limit comparator, and an output which is the output of said arc gap length monitoring unit whose inputs are said inputs of said lower and upper limit comparators.

* * * * *